Figure 1:
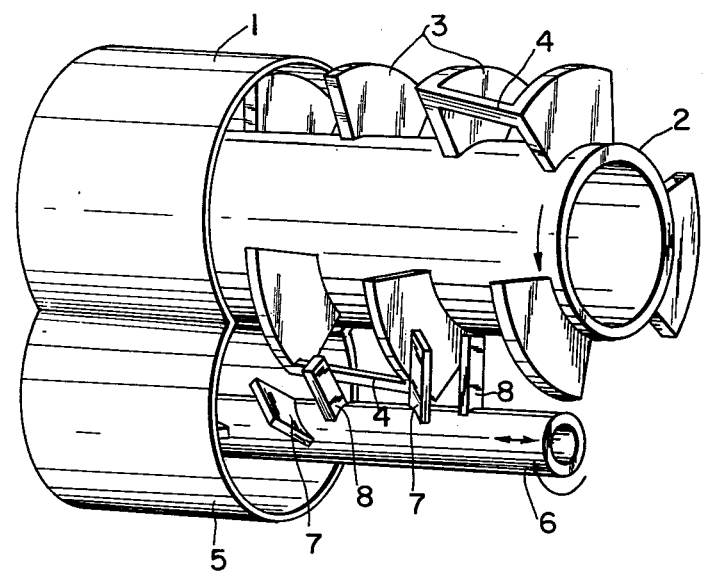

United States Patent [19]

Baurecht et al.

[11] 4,118,391

[45] Oct. 3, 1978

[54] PROCESS FOR THE PREPARATION OF COPPER PHTHALOLCYANINE

[75] Inventors: Heinz-Ewald Baurecht; Reinhold Hörnle; Gerd Müller, all of Cologne, Germany

[73] Assignee: Bayer Aktiengesellschaft, Leverkusen, Germany

[21] Appl. No.: 778,154

[22] Filed: Mar. 16, 1977

[30] Foreign Application Priority Data

Mar. 18, 1976 [DE] Fed. Rep. of Germany ....... 2611546

[51] Int. Cl.$^2$ ............................................. C09B 47/04
[52] U.S. Cl. .................................................. 260/314.5
[58] Field of Search ...................................... 260/314.5

[56] References Cited

FOREIGN PATENT DOCUMENTS 2,432,564  1/1976  Fed. Rep. of Germany ........ 260/314.5

*Primary Examiner*—John M. Ford
*Attorney, Agent, or Firm*—Plumley and Tyner

[57] ABSTRACT

The production of copper phthalocyanine in accordance with German Offenlegungsschrift No. 2,432,564 is improved by the process which is characterized in that the reaction product formed at 130°–300° C from optionally substituted phthalic anhydride, reaction products of optionally substituted phthalic anhydride with ammonia, or the dehydration products thereof, urea and, optionally, a catalyst is reacted with a copper salt and, optionally, a catalyst at temperatures of 150°–350° C and preferably 170°–300° C with the proviso that the catalyst is added either during the preparation of the starting material or during the reaction with the copper salt.

6 Claims, 2 Drawing Figures

U.S. Patent  Oct. 3, 1978  4,118,391

PROCESS FOR THE PREPARATION OF COPPER PHTHALOLCYANINE

Copper phthalocyanine (CuPc) is prepared on a large industrial scale by two different processes which differ in the starting materials used.

One process, which is known as the "phthalodinitrile process", consists in reacting phthalic acid dinitrile with a copper salt at temperatures of up to 250° C. This reaction is very highly exothermic, so that it is usually necessary to dilute the reaction mixture with a solvent since temperatures which are too high lead to a markedly reduced yield.

The other process, which is known as the "urea process", consists in reacting phthalic anhydride, or certain derivatives of phthalic anhydride, such as diammonium phthalate, phthalimide and phthalamide, with urea, a copper salt and a catalyst, for example ammonium molybdate, at temperatures of between 170° and 250° C. This process is very important industrially but involves several technical difficulties. When phthalic anhydride, urea, a copper salt and the catalyst are heated up together, the reaction mixture melts at 115°–130° C., becomes solid or virtually solid again at 170°–180° C. and sometimes also passes through a partially liquid phase at about 200° C. before CuPc is finally formed. Large amounts of ammonia are liberated during the entire reaction period. A considerable quantity of by-products, such as ammonium salts, sublimes off. As a result of the liberation of volatile by-products, the reaction mass foams and the crude pigment is obtained in the form of porous reaction cake which tends to cake and thus severely impairs the heat transfer. In order to facilitate degassing and to prevent individual reactants settling out it is, of course, advantageous to carry out the reaction whilst stirring. However, difficulties are encountered with this procedure because the reaction product tenaciously cakes on the walls of the reaction vessel and on the stirrer, above all on the heated surfaces, so that it is difficult to achieve homogeneous mixing. Moreover, the caked material makes it considerably more difficult to empty the reaction vessel.

Attempts are made to avoid these difficulties by diluting the reaction mixture with an inert solvent, for example nitrobenzene or trichlorobenzene. However, the removal of the solvent necessitates time-consuming and costly operations, such as filtration, distillation and the like. The solvent itself must then be worked up again and this further increases the cost of the process.

However, solvent-free processes are also known. Thus, it is possible, for example, to distribute the premixed components in thin layers on metal sheets and to heat the sheets to the required reaction temperature for several hours. The process incurs very high wage costs and leads to unsatisfactory yields and has therefore been replaced by the solvent process, despite the difficulties mentioned above.

A further process is described in U.S. Pat. No. 2,964,532 and consists in putting through a thin layer, $\frac{1}{4}$ to $\frac{1}{2}$ an inch thick, of a mixture of phthalic anhydride, urea and a metal or metal salt at temperatures between 200° and 250° C. between the inner surface of a cylinder and the inner surface of a screw rotor within this cylinder. Because the layer thickness is restricted to 0.25 to 0.5 inch, which is necessary in order to ensure adequate heat transfer and adequate mixing, this process has the disadvantage of a very unfavourable space-time yield since the volume which is used makes up only 2.5 to 7% of the total volume of the apparatus when an effective volume of 200 liters is assumed.

This volume would be necessary for a large scale industrial production of 2,000 tons of CuPc per year. As can be seen from the drawing in U.S. Pat. No. 2,964,532, this volume could be achieved only when the screw shaft is 10 m long and 1 m in diameter and this would present extraordinary difficulties in the manufacture of, and with the type of bearings for, the shaft because of the required tolerance limit of 1/16 inch.

The high costs of apparatus associated therewith make the process uneconomical for large scale industrial production.

A further process, in which phthalic anhydride, urea, $Cu_2Cl_2$ and ammonium molybdate are metered in to a heated, rotating drum in which granular copper phthalocyanine reaction product which has already completely reacted is present in an amount which suffices to prevent coating but constitutes at least the throughput of two hours, is described in U.S. Pat. No. 3,188,318. Because of the long residence time and the partial filling of about 25% which is required, very large drums are required with this process also if it is desired to produce CuPc on a large industrial scale. If, for example, in accordance with the data given in Example 1 of the cited Patent Specification, it were desired to achieve an annual production of 2,000 tons of CuPc per year, a drum which has a capacity of at least 30 cubic meters and is filled with about 10 tons of reaction product is necessary for this purpose and this drum would have to be moved at a speed of 11 revolutions per minute. Uniform temperature control is possible only with difficulty, since the apparatus can be heated only from the outside and the pulverulent reaction product is only a poor conductor of heat. Moreover, because of the high dead weight of the reaction mass, caking can no longer be avoided when the process is carried out on this scale and this impairs the heat transfer and reduces the throughput and the yield. Although the process is suitable for smaller production units it cannot be realised on a large industrial scale.

A process in which the urea process is carried out in a rotary mill, for example a ball mill or pinned disc mill, is claimed in U.S. Pat. No. 3,280,142. This discontinuous procedure has the disadvantage that, because it is necessary for the reaction mass to cool before the apparatus is emptied, a cycle time of 90 to 180 minutes is required althouth the reaction time is only 5 to 45 minutes. The economics of the process are greatly impaired as a result of this and because emptying incurs high wage costs.

Economical utilisation of the solvent-free urea process, that is to say the so-called 'urea baking process', has been made possible for the first time by the procedure according to German Offenlegungsschrift (German Published Specification) No. 2,432,564. The process is characterised in that optionally substituted phthalic anhydride, or reaction products of phthalic anhydride with ammonia, or the dehydration products thereof, are reacted with urea, a copper salt and a catalyst at temperatures of 150° to 300° C., and preferably of 190° to 250° C., and with residence times of between 5 minutes and 5 hours, and preferably between 5 and 45 minutes, in a reactor which has the following characteristics: (a) self-cleaning of at least 75%, and preferably at least 85%, of the heated surfaces; (b) an effective volume of at least 40%, and preferably at least 50%, of the total volume of the reactor, the effective volume being at least 10 l; and (c) a possibility for heating inside the reactor with a heating surface of at least 34% of the heatable internal surface of the housing.

Self-cleaning is understood as the restriction, imposed by the apparatus, to a maximum layer thickness of 2 cm and preferably 1 cm, or the forcible scraping of caked material on the heated surfaces to a layer thickness of at most 2 cm and preferably at most 1 cm.

The condition, according to the invention, of self-cleaning of at least 75% of the heated surfaces can be met in various ways, for example by a shaft which rotates and oscillates at the same time, the shaft cleaning itself on kneader bars which have a suitable geometric shape and are fixed inside the housing, or by a twin screw machine of very diverse design.

A particularly suitable reactor for the process according to the invention is characterised by 2 or more stirrers which are in a housing of appropriate shape, operate in parallel and cut across one another. The main shaft which has a radial arrangement of disc-shaped elements, the peripheries of which are joined by kneader bars, runs in a cylindrical housing. A cleaning shaft of smaller diameter rotates parallel to the main shaft and has, fitted thereon, mountings for which the construction and rotational speed are so chosen that the mountings engage between the disc-shaped elements of the main shaft and continuously clean the surfaces thereof. The housing of the main shaft is cleaned by the kneader bars and the housing of the cleaning shaft is cleaned by the mountings of the cleaning shaft. Both the main shaft and the cleaning shaft can be heated.

A suitable apparatus for carrying out the process batch-wise is shown diagrammatically in FIG. 1.

The main shaft 2, which has a radial arrangement of disc-shaped elements 3, which are joined at the periphery by the kneader bars 4, rotates in the cylindrical housing 1. The cleaning shaft 6, which is provided with paddles 7 and scrapers 8, rotates in the cylindrical housing 5.

A particularly preferred embodiment of the process according to the invention is the use of reactors which operate continuously. With the apparatus previously described, for example, this is achieved by generating an axial force, which is similar to that of a screw and transports the product through the machine, by positioning the kneader bars and the mountings at an angle. It is thus possible to utilise the advantage of the short reaction time to the full since the reaction product can be discharged continuously or semi-continuously without having to be cooled.

Figure 2:
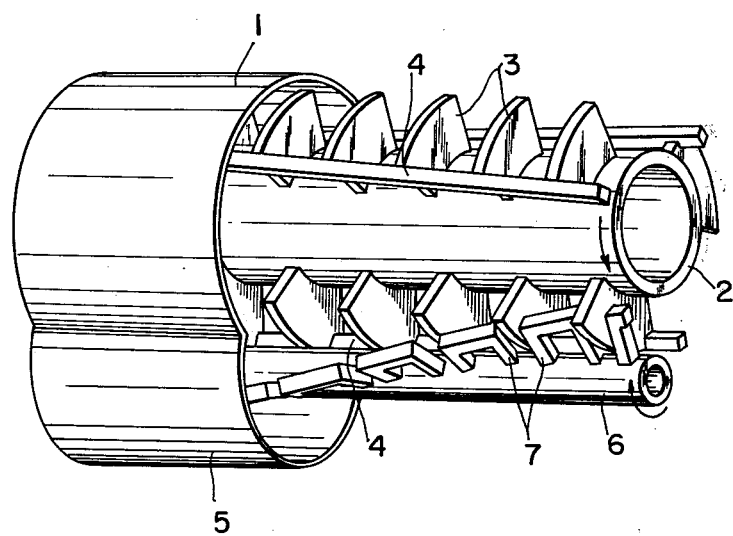

A suitable apparatus for carrying out the process continuously is shown diagrammatically in FIG. 2.

The main shaft 2, which is provided with disc-shaped elements 3 and kneader bars 4, rotates in the housing 1. The cleaning shaft 6 is provided with the mountings 7 and rotates in the housing 5.

A particularly suitable apparatus is the AP reactor from Messrs. H. List (Pratteln, Switzerland) and the experiments described in the examples have also been carried out with this. The reactors can be made of steel but also of other materials, for example of Hastelloy, titanium or enamelled steel.

With this process yields of copper phthalocyanine of 75-80%, relative to phthalic anhydride, are obtained, higher yields being achieved only with smaller throughputs.

A process has now been found which leads, in all 'urea baking processes' to increases in the absolute yield and in the space-time yield. In particular, the mode of preparation of copper phthalocyanine in accordance with German Offenlegungsschrift (German Published Specification) No. 2,432,564 is improved by the process.

The process is characterised in that the reaction product formed at 130°–300° C., preferably at 170°–230° C., from optionally substituted phthalic anhydride, reaction products of optionally substituted phthalic anhydride with ammonia, or the dehydration products thereof, urea and, optionally, a catalyst is reacted with a copper salt and, optionally, a catalyst at temperatures of 150°–350° C. and preferably 170°–300° C. with the proviso that the catalyst is added either during the preparation of the starting material or during the reaction with the copper salt.

After the reaction, the melt of the phthalic acid derivative, urea and, optionally, a catalyst should have a nitrogen content of 3–10, preferably 3.1–6, g atoms of N/mol of phthalic acid derivative.

A procedure in which the ratio of the phthalic acid derivative to urea and the reaction temperature and reaction period are so chosen that, during the reaction, 1–4 mols of $NH_3$ are evolved per mol of the phthalic acid derivative is particularly preferred.

Examples of suitable phthalic acid derivatives are phthalic anhydride, diammonium phthalate, phthalimide, phthalic acid diamide, amino-imino-isoindolenine and 1-amino-3-oxoisoindolenine and the corresponding phthalic acid derivatives which are substituted by halogen, such as chlorine and bromine, $C_1$–$C_4$-alkyl, such as methyl and ethyl, phenyl, $C_1$–$C_4$-alkoxy, such as methoxy and ethoxy, and sulpho.

Phthalic anhydride and mixtures of phthalic anhydride and 4-chlorophthalic acid, and also tetrachlorophthalic acid are preferred.

Examples of suitable copper salts are copper sulphate, copper chloride and basic copper carbonate.

Basic copper carbonate is preferred.

Catalysts which can be used are those mentioned in F. H. Moser and A. L. Thomas, Phthalocyanine Compounds, Reinhold Publishing Corp. (1963), page 151, and amongst these ammonium molybdate and molybdenum trioxide are preferred.

The components phthalic acid derivative and urea are appropriately employed in molar ratios of 4:(6–30) and preferably of 4:(10–20).

The components 'reaction product' and copper salt are appropriately employed in molar ratios of 4:(0.8–2) and preferably 4:(0.9–1.2), relative to phthalic anhydride.

The amount of catalyst is 0.01–1% by weight and preferably 0.1–0.6% by weight, relative to the amount of the phthalic acid derivative.

The achievement of the given object, that is to say the large scale industrial preparation of CuPc without the use of solvents, in the form of the present invention is a surprising technical advance since yields as high as from 89 to 100% of theory, relative to phthalic anhydride, may be achieved. Compared with the process of DT-OS (German Published Specification) No. 2,432,564, the fact that the residence time in the reactor can be reduced with, at the same time, greater, time-independent utilisation of the volume is also an advantage since the preparation of the reaction product from phthalic anhydride, urea and, optionally, a catalyst, can be carried out in different, more simple apparatuses, for example in stirred kettles which can be heated.

EXAMPLE 1

31.7 kg/hour of a mixture of 13.05 kg of phthalic anhydride, 18.5 kg of urea and 0.15 kg of $MoO_3$ are fed to a 18 l AP-Conti reactor from Messrs. List, Pratteln, Switzerland. The temperature of the heating medium and the rotational speed for the reactor are so chosen that the liquid reaction product reaches a final temperature of 210° C. 18.7 kg/hour of a melt are withdrawn from the reactor and the reaction product is ground after cooling.

32.1 kg/hour of a mixture of 26.3 kg of the intermediate prepared in this way and 5.8 kg of $CuSO_4.H_2O$ are fed to a 18 l AP reactor and the rotational speed of the shaft and the temperature of the heating medium are so chosen that the reaction product reaches a final temperature of 225° C.

27.0 kg/hour of a 64.3% strength CuPc crude product are obtained and are worked up in the customary manner.

The yield of 100% strength CuPc is 96.5% of theory, relative to phthalic anhydride.

If the synthesis is carried out according to the customary baking process by feeding the reactants as a mixture and conjointly to the reactor, a yield of only at most 83.5% is achieved with a throughput of only 10–15 kg of the synthesis mixture of the above composition. With a throughput of 50 kg/hour of the synthesis mixture, corresponding to the throughput indicated in the example, a yield of only 40–50% of 100% strength CuPc is obtained.

EXAMPLE 2

23.70 kg/hour of molten phthalic anhydride, 33.6 kg/hour of urea and 240 g/hour of ammonium molybdate are fed to a 50 l stirred kettle which can be heated. The kettle is so heated that the contents of the kettle reach a temperature of 190° C. After 15 minutes, melt is pumped from the kettle, via a pump controlled by a bottom pressure transmitter, into an 18 l AP reactor from Messrs. List, Pratteln, in an amount such that the contents of the kettle remain constant and, at the same time, 6.7 kg/hour of $CuSo_4$ are metered into the AP reactor. The temperature of the heating medium of the AP reactor is so chosen that the reaction product reaches a final temperature of 230° C. 35.2 kg/hour of a 63.5% strength crude CuPc are withdrawn from the reactor and this corresponds to a yield of 97% of theory, relative to phthalic anhydride.

EXAMPLE 3

300 kg/hour of molten phthalic anhydride, 485 kg/hour of urea and 3 kg/hour of $MoO_3$ are fed to a KO reactor KR 300 from Messrs. Buss AG, CH-4002 Basel. Heating of the reactor is so chosen that the temperature of the reaction melt reaches 195° C. after the half-way point in the length of the reactor.

After the half-way point in the length of the reactor, 55 kg/hour of basic Cu carbonate and a Cu content of 54–56% are fed in via a packing screw and in the second half of the reactor the heating is so adjusted that the reaction product reaches a final temperature of 220° C. 455 kg/hour of 59% strength crude CuPc, which corresponds to a yield of 99.3% are withdrawn from the reactor.

EXAMPLE 4

13.3 kg/hour of molten phthalic anhydride, 6.0 kg/hour of 3-chlorophthalic acid, 28.8 kg/hour of urea and 150 g of ammonium molybdate are fed to a 50 l stirred kettle which can be heated. The kettle is so heated that the contents of the kettle reach a temperature of 200° C. After 20 minutes, melt is pumped from the kettle, via a pump controlled by a bottom pressure transmitter, into an 18 l AP reactor from Messrs. List, Pratteln, in an amount such that the contents of of the kettle remain constant and, at the same time, 5.5 kg/hour of $CuCl_2.H_2O$ are metered into the AP reactor. The temperature of the heating medium of the AP reactor is so chosen that the reaction product reaches a final temperature of 230° C. 35.5 kg/hour of a 58% strength crude product are withdrawn from the reactor and this corresponds to a yield of 89% of theory, relative to the sum of the phthalic acid compounds.

We claim:

1. In the process for the preparation of copper phthalocyanine by the baking process from
   (a) phthalic acid anhydride, diammonium phthalate, phthalimide, phthalic acid diamide, aminio-imino-isoindolenine or 1-amino-3-oxo-isoindolenine or said compounds substituted by chlorine, bromine, $C_1$–$C_4$-alkyl, phenyl, $C_1$–$C_4$-alkoxy or sulpho,
   (b) urea,
   (c) a catalyst and
   (d) a copper salt at temperatures of 150°–350° C. the improvement which comprises reacting ingredients (a) and (b) at 130°–300° C., to form an intermediate, and subsequently reacting said intermediate with ingredient (d); ingredient (c) being added during either of the two above-described reaction steps.

2. Process according to claim 1 wherein the reaction is performed in a reactor which has the following characteristics:
   (a) self-cleaning of at least 75% of the heated surfaces,
   (b) an effective volume of at least 40% of the total volume of the reactor, the effective volume being at least 10 liters, and
   (c) means for heating inside the reactor with a heating surface of at least 34% of the heatable internal surface area of the housing.

3. Process according to claim 2, wherein the reactor has the following characteristics:
   (a) self-cleaning of at least 85% of the heated surfaces,
   (b) an effective volume of at least 50% of the total volume of the reactor, the effective volume being at least 10 liters; and
   (c) means for heating inside the reactor with a heating furface of at least 34% of the heatable internal surface area of the housing.

4. Process according to claim 2, wherein the reactor contains, in a housing of appropriate shape, two or more stirrers which operate in parallel and cut across one another; the main shaft possesses a radical arrangement of disc-shaped elements which are joined at the periphery by kneader bars; and the cleaning shaft, which is of smaller diameter has mountings fitted thereon to operate between said disc-shaped elements and continuously clean the surfaces thereof; the housing of the main shaft being cleaned by the kneader bars; and the housing of the cleaning shaft being cleaned by the mountings.

5. Process according to claim 1 which is carried out continuously.

6. Process according to claim 1, wherein phthalic anhydride, tetrachlorophthalic anhydride or mixtures of phthalic anhydride and 4-chlorophthalic acid are reacted with urea in the presence of ammonium molybdate or molybdenum trioxide and the reaction product is then reacted with copper carbonate.

* * * * *